United States Patent
Takeda

(10) Patent No.: US 9,247,488 B2
(45) Date of Patent: Jan. 26, 2016

(54) WIRELESS ACCESS POINT SEARCH DEVICE AND METHOD IMPROVED IN MANNER OF STORING SEARCH RESULTS, CONTROL PROGRAM, AND STORAGE MEDIUM

(75) Inventor: Kyohei Takeda, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 13/496,910

(22) PCT Filed: Dec. 22, 2011

(86) PCT No.: PCT/JP2011/080554
§ 371 (c)(1),
(2), (4) Date: Mar. 19, 2012

(87) PCT Pub. No.: WO2012/091146
PCT Pub. Date: Jul. 5, 2012

(65) Prior Publication Data
US 2012/0196639 A1 Aug. 2, 2012

(30) Foreign Application Priority Data

Dec. 28, 2010 (JP) .................................. 2010-292287

(51) Int. Cl.
*H04W 68/00* (2009.01)
*H04W 48/16* (2009.01)
(Continued)

(52) U.S. Cl.
CPC .............. *H04W 48/16* (2013.01); *H04W 24/10* (2013.01); *H04W 84/12* (2013.01)

(58) Field of Classification Search
CPC ..... H04W 48/00; H04W 48/16; H04W 48/20; H04W 68/00; H04W 68/02; H04W 72/0426; H04W 72/085; H04W 52/0206

USPC ........................ 455/515, 456.2, 458; 370/328
See application file for complete search history.

(56) References Cited

U.S. PATENT DOCUMENTS 7,904,086 B2 * 3/2011 Kundu et al. .................. 455/436
8,131,859 B2 * 3/2012 Fujii et al. ...................... 709/228
(Continued)

FOREIGN PATENT DOCUMENTS

CN 101491144 A 7/2009
JP 2001-308866 A 11/2001
(Continued)

OTHER PUBLICATIONS

International Search Report issued Feb. 21, 2012 for parent PCT/JP/2011/080554.
(Continued)

*Primary Examiner* — Nay A Maung
*Assistant Examiner* — Angelica M Perez
(74) *Attorney, Agent, or Firm* — Rossi, Kimms & McDowell LLP

(57) ABSTRACT

A wireless access point search device improved in a manner of storing search results. A wireless LAN interface searches for a wireless access point. A result receiving section stores an access point information item on the wireless access point found by the wireless LAN interface. When the sum of the number of access point information items stored in the result receiving section and the number of new wireless access point items on respective new wireless access points found by the wireless LAN interface is larger than a predetermined value, a panel controller determines, whether or not to store a new access point information item on each new wireless access point in the result receiving section, based on radio field intensity of the new wireless access point.

11 Claims, 8 Drawing Sheets

(51) Int. Cl.
*H04W 24/10* (2009.01)
*H04W 84/12* (2009.01)

(56) References Cited

U.S. PATENT DOCUMENTS

| | | | |
|---|---|---|---|
| 8,467,784 | B2 | 6/2013 | Balasubramanian et al. |
| 2006/0003769 | A1 | 1/2006 | Liu et al. |
| 2006/0206592 | A1 | 9/2006 | Fujii et al. |
| 2006/0256763 | A1* | 11/2006 | Nguyen et al. ............... 370/338 |
| 2007/0097897 | A1 | 5/2007 | Teague et al. |
| 2007/0249344 | A1* | 10/2007 | Hosono et al. ............. 455/435.1 |
| 2008/0117884 | A1 | 5/2008 | Ishii et al. |
| 2009/0005052 | A1* | 1/2009 | Abusch-Magder et al. .. 455/446 |
| 2009/0052414 | A1 | 2/2009 | Senga et al. |
| 2009/0161639 | A1* | 6/2009 | Ostergren .................... 370/338 |
| 2009/0222659 | A1 | 9/2009 | Miyabayashi et al. |
| 2009/0245176 | A1* | 10/2009 | Balasubramanian et al. 370/328 |
| 2010/0303040 | A1* | 12/2010 | Takamune ................... 370/331 |
| 2011/0128890 | A1* | 6/2011 | Schein et al. ................ 370/255 |
| 2011/0299422 | A1* | 12/2011 | Kim et al. .................... 370/328 |
| 2013/0022104 | A1* | 1/2013 | Chen et al. ............... 375/240.02 |

FOREIGN PATENT DOCUMENTS

| | | |
|---|---|---|
| JP | 2005-244721 A | 9/2005 |
| JP | 2006005630 A | 1/2006 |
| JP | 2006020331 A | 1/2006 |
| RU | 2395935 C2 | 7/2010 |
| WO | 2004/098128 A1 | 11/2004 |

OTHER PUBLICATIONS

Japanese Office Action issued in Japanese counterpart application No. JP2010292287, dated Jan. 13, 2015.

Korean Office Action cited in Korean counterpart application No. KR10-2013-7019034, dated Sep. 30, 2014.

Chinese Office Action issued in Chinese counterpart application No. CN201180063622.3, dated Aug. 5, 2015. English translation provided.

Russian Notice of Allowance issued in Russian counterpart application No. RU2013135230, dated Aug. 11, 2015. English translation provided.

\* cited by examiner

*RELETED ART*

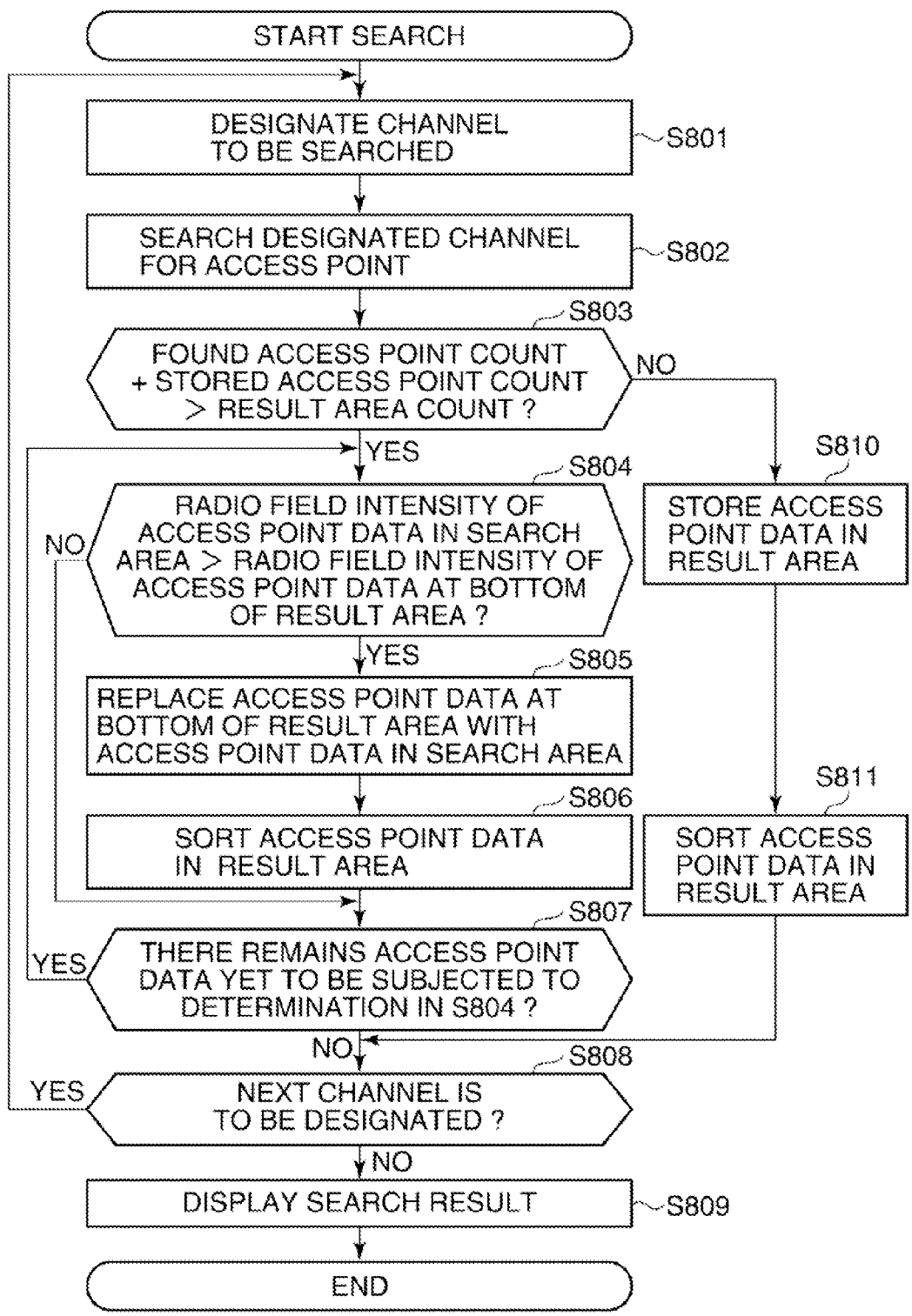

WIRELESS ACCESS POINT SEARCH DEVICE AND METHOD IMPROVED IN MANNER OF STORING SEARCH RESULTS, CONTROL PROGRAM, AND STORAGE MEDIUM

This application is a U. S. National Phase Application of PCT International Application PCT/JP2011/080554 filed on Dec. 22, 2011 which is based on and claims priority from JP 2010-292287 filed on Dec. 28, 2010 the contents of which is incorporated herein in its entirety by reference.

TECHNICAL FIELD

The present invention relates to a wireless access point search device and method for searching for a wireless access point, a control program, and a storage medium, and more particularly to a method of setting a wireless LAN in a wireless LAN station.

BACKGROUND ART

In recent years, a wireless LAN (local area network) technique using IEEE 802.11b/11g/11n has been applied to various apparatuses. The use of this wireless LAN technique makes it possible to interconnect various apparatuses via a wireless line. When the various apparatuses are interconnected via the wireless line, a place where each of the apparatus is to be located can be selected as desired, and cables or the like can be dispensed with differently from a wired network, which saves troublesome work of the user. In view of the advantages of the wireless LAN, in each of an increasing number of homes, a wireless LAN environment tends to be constructed by arranging wireless LAN access points.

For a wireless LAN access point, it is possible to set a unique ID called SSID (service set identifier) for identifying the access point and security for protecting wireless communication. When access point search is performed by an apparatus, such as a printer, which is wireless LAN-compatible, SSIDs, security settings, etc. are displayed in a list as search results e.g. on a display panel provided in the apparatus.

The SSID and the security are required to be set in advance by a user. In general, however, default settings are configured by a manufacturer, and many of users use an apparatus, such as a printer, without changing the default settings. Therefore, when access point search is performed under an environment, e.g. in a condominium, where a lot of access points densely exist, a plurality of access points having the same SSID are sometimes detected. In such a case, the apparatus is required to select an access point desired by the user for connection, out of the found access points.

In view of such a case, there has been proposed a method in which access points that satisfy a specific condition, such as radio field intensity, are registered as candidates for selection in advance, and when a plurality of access points having the same SSID are detected, an access point is selected from the registered candidates.

CITATION LIST

Patent Literature

PTL 1: Japanese Patent Laid-Open Publication No. 2001-308866

SUMMARY OF INVENTION

Technical Problem

However, an apparatus which does not have sufficient memory resources (i.e. memory capacity) is not capable of securing a sufficient area for storing search results. Therefore, under an environment where a plurality of access points are found by search, it is impossible to store all search results in a memory, and hence even an access point having radio field intensity higher than a predetermined level is sometimes omitted from the search results.

Accordingly, the present invention provides a wireless access point search device and method for storing results of access point search in such an improved manner that can reduce the possibility of failing to store an access point that satisfies a specific condition, a control program, and a storage medium.

Solution to Problem

Accordingly, in a first aspect of the present invention, there is provided a wireless access point search device comprising a search unit configured to search for a wireless access point, a storage unit configured to store an access point information item on the wireless access point found by the search unit, and a control unit configured to determine, in a case where a sum of the number of access point information items stored in the storage unit and the number of new wireless access point information items on respective new wireless access points found by the search unit is larger than a predetermined number, whether or not to store a new access point information item on each new wireless access point in the storage unit, based on radio field intensity of the new wireless access point.

Accordingly, in a second aspect of the present invention, there is provided a method of searching for a wireless access point, comprising searching for a wireless access point, storing an access point information item on the wireless access point found by the searching in a storage unit, and determining, in a case where a sum of the number of access point information items stored in the storage unit and the number of new wireless access point information items on respective new wireless access points found by the searching is larger than a predetermined number, whether or not to store a new access point information item on each new wireless access point in the storage unit, based on radio field intensity of the new wireless access point.

Accordingly, in a third aspect of the present invention, there is provided a computer-executable program for causing a computer to execute a method of searching for a wireless access point, wherein the method comprises searching for a wireless access point, storing an access point information item on the wireless access point found by the searching in a storage unit, and determining, in a case where a sum of the number of access point information items stored in the storage unit and the number of new wireless access point information items on respective new wireless access points found by the searching is larger than a predetermined number, whether or not to store a new access point information item on each new wireless access point in the storage unit, based on radio field intensity of the new wireless access point.

Accordingly, in a fourth aspect of the present invention, there is provided a non-transitory computer-readable storage medium storing the computer-executable program.

According to the present invention, it is possible to reduce the possibility of failing to store an access point that satisfies a specific condition, when storing results of access point search, to thereby improve storage of search results.

Further features of the present invention will become apparent from the following description of exemplary embodiments with reference to the attached drawings.

BRIEF DESCRIPTION OF DRAWINGS

[FIG. 8] A flowchart of an access point search process executed by the access point search function in FIG. 7.

DESCRIPTION OF EMBODIMENTS

The present invention will now be described in detail below with reference to the drawings showing embodiments thereof.

Figure 1:
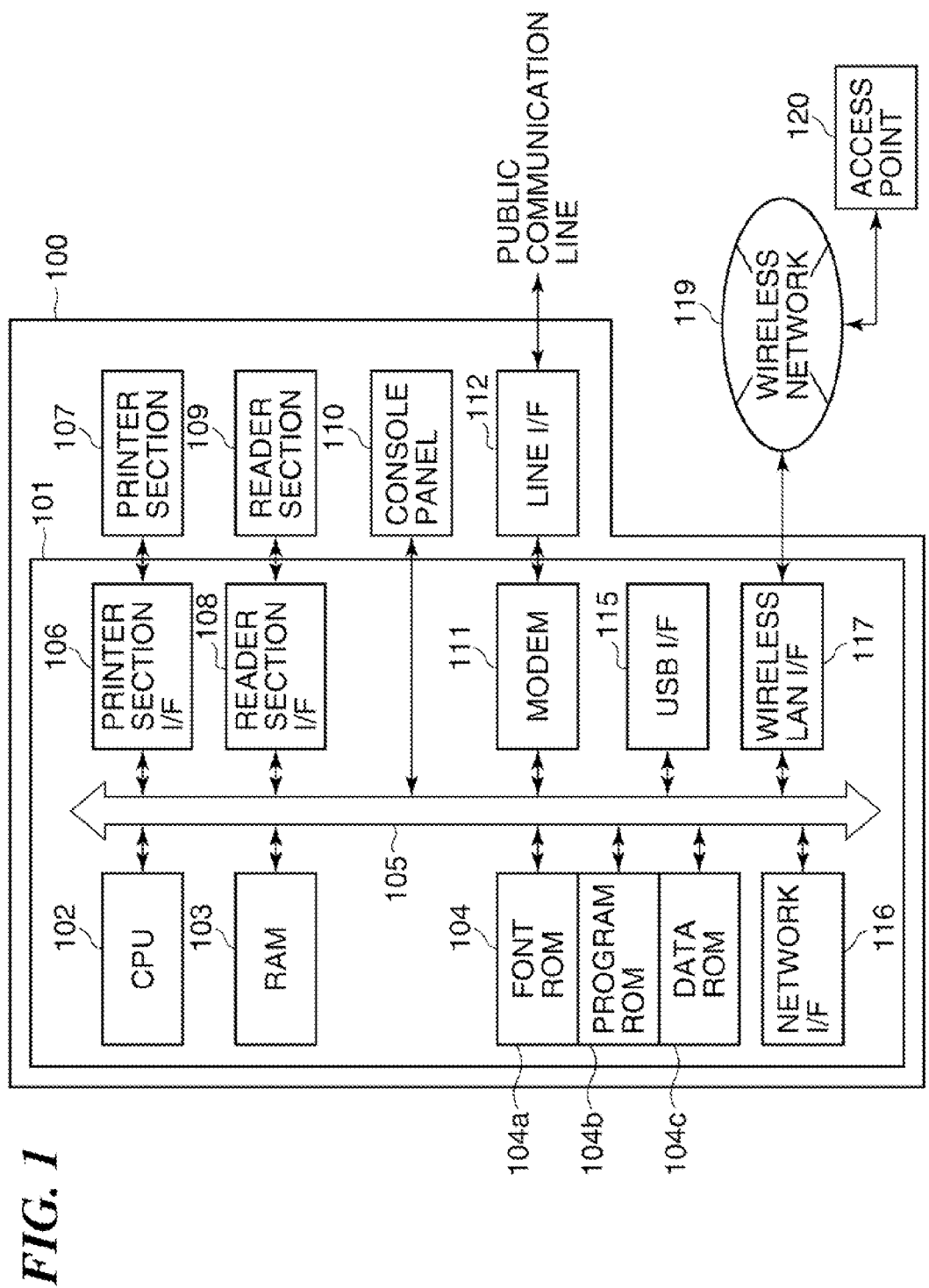
[FIG. 1] A block diagram of an image forming apparatus as a wireless access point search device according to a first embodiment of the present invention.

FIG. 1 is a block diagram of an image forming apparatus as a wireless access point search device according to a first embodiment of the present invention. As examples of the image forming apparatus, there may be mentioned a printer and an MFP (multi-function peripheral) which are equipped with a wireless transmission and reception function. Although in the following, a description will be given of the image forming apparatus equipped with the wireless transmission and reception function, the present invention can also be applied to a device or apparatus other than the image forming apparatus insofar as it is equipped with the wireless transmission and reception function and is capable of performing wireless communication with a wireless access point.

As shown in FIG. 1, the image forming apparatus 100 comprises a printer section 107, a reader section 109, a console panel 110, a line interface 112, and a controller section 101.

The controller 101 comprises a CPU 102, a RAM 103, a ROM 104, a printer section interface 106, a reader section interface 108, a modem 111, a USB (universal serial bus) interface 115, a network interface 116, and a wireless LAN interface 117. These blocks are interconnected by a system bus 105.

The CPU 102 performs centralized overall control of the image forming apparatus according to a control program. This control program is stored in a program area (program ROM 104b) of the ROM 104, and the CPU 102 reads out the control program from the ROM 104 and executes the same. In the illustrated example, the ROM 104 comprises a font ROM 104a, the program ROM 104b, and a data ROM 104c.

When the control program is stored as compressed data in the program area of the ROM 104, the CPU 102 expands the compressed data to load the expanded data in the RAM 103, and then executes the same. Note that the control program may be stored in a hard disk drive (HDD), not shown, in a compressed or non-compressed state.

The wireless LAN interface 117 performs communication with an access point 120 via a wireless network 119. The modem 111 is connected to a public communication line via the line interface 112 to perform processing for communication with an external apparatus (not shown), such as an image forming apparatus, a facsimile machine, or a telephone set. In general, the line interface 112 and the public communication line are connected to each other by a telephone line.

The printer section interface 106 is used as an interface for outputting a recorded image signal (image data) to the printer section (printer engine) 107. The reader section interface 108 is used as an interface for inputting a read image signal obtained as a result of reading by the reader section (scanner engine) 109. The CPU 102 processes the read image signal input from the reader section 109 and outputs the processed read image signal input as a recorded image signal to the printer section interface 106.

The CPU 102 causes a display section of the console panel 110 to display characters and symbols, using font information stored in the font ROM 104a. Further, the CPU 102 receives a user instruction via the console panel 110.

The CPU 102 causes the data ROM 104c to store information (status information) on the image forming apparatus, user telephone directory information, information on management of departments and sections of an organization, and the like information. The CPU 102 reads out a desired one of these pieces of information from the data ROM 104c and updates the same, as required.

As described above, the image forming apparatus 100 has the copy function, the scan function, and the facsimile function. Further, the image forming apparatus 100 has a function of performing printing designated e.g. by a PC (personal computer) via the USB interface 115 or the wireless network 119.

Figure 2:
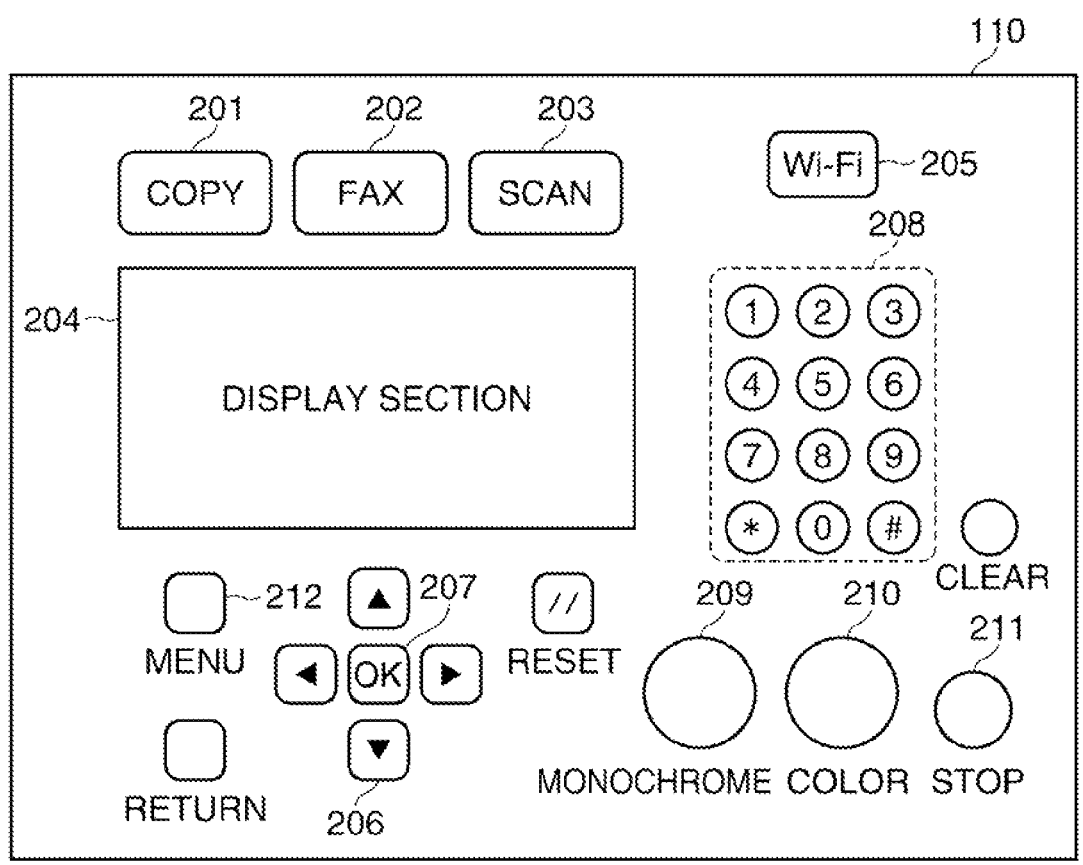
[FIG. 2] A view of a console panel appearing in FIG. 1.

FIG. 2 is a view of the console panel 110 appearing in FIG. 1.

The console panel 110 is provided with function keys 201 to 203 for use in selecting the above-mentioned functions, respectively. A user presses one of the function keys 201 to 203 corresponding to a function which the user desires to use.

Further, the console panel 110 is provided with a display section 204, which displays settings configured by the user, the apparatus status of the image forming apparatus 100, and so forth.

An arrow key 206 is used to move a cursor or the like displayed on the display section 204. The arrow key 206 comprises upper, lower, left, and right buttons. An OK key 207 is disposed in the center of the arrow key 206, and functions as a "determination" key for performing determination of a configuration or a query.

For example, when the user desires to change a copy setting (sheet size), the user presses the function key 201 (copy function button), and causes the display section 204 to display a copy function screen. Then, the user selects an item (sheet size) to be changed, using the arrow key 206, and then presses the OK key 207. As a consequence, a configuration screen for selecting a sheet size is displayed on the display section 204. Then, when the user moves the cursor to a desired configuration position (a desired sheet size in the present example) using the arrow key 206 on the configuration screen and presses the OK key 207, the desired sheet size is set.

Note that in the case of inputting the number of copies to be printed or a telephone number for the facsimile function, the user uses a ten key pad 208.

In the illustrated example, a monochrome start key 209 and a color start key 210 are provided as keys for use in giving an instruction for starting a copy, scan, or facsimile operation. A stop key 211 is for use in giving an instruction for stopping an operation of each function. A menu key 212 is for use in shifting to a menu screen for changing various configurations of the image forming apparatus 100.

Further, the console panel 110 shown in FIG. 2 is provided with an LED (light emitting diode: Wi-Fi) 205. The LED 205 is off during disconnection of the image forming apparatus 100 from the wireless LAN, and flashes when connection of the imace forming apparatus 100 to the access point 120 is being attempted. Then, when the connection to the access point 120 has been successfully attained, the LED 205 is lit up.

Figure 3:
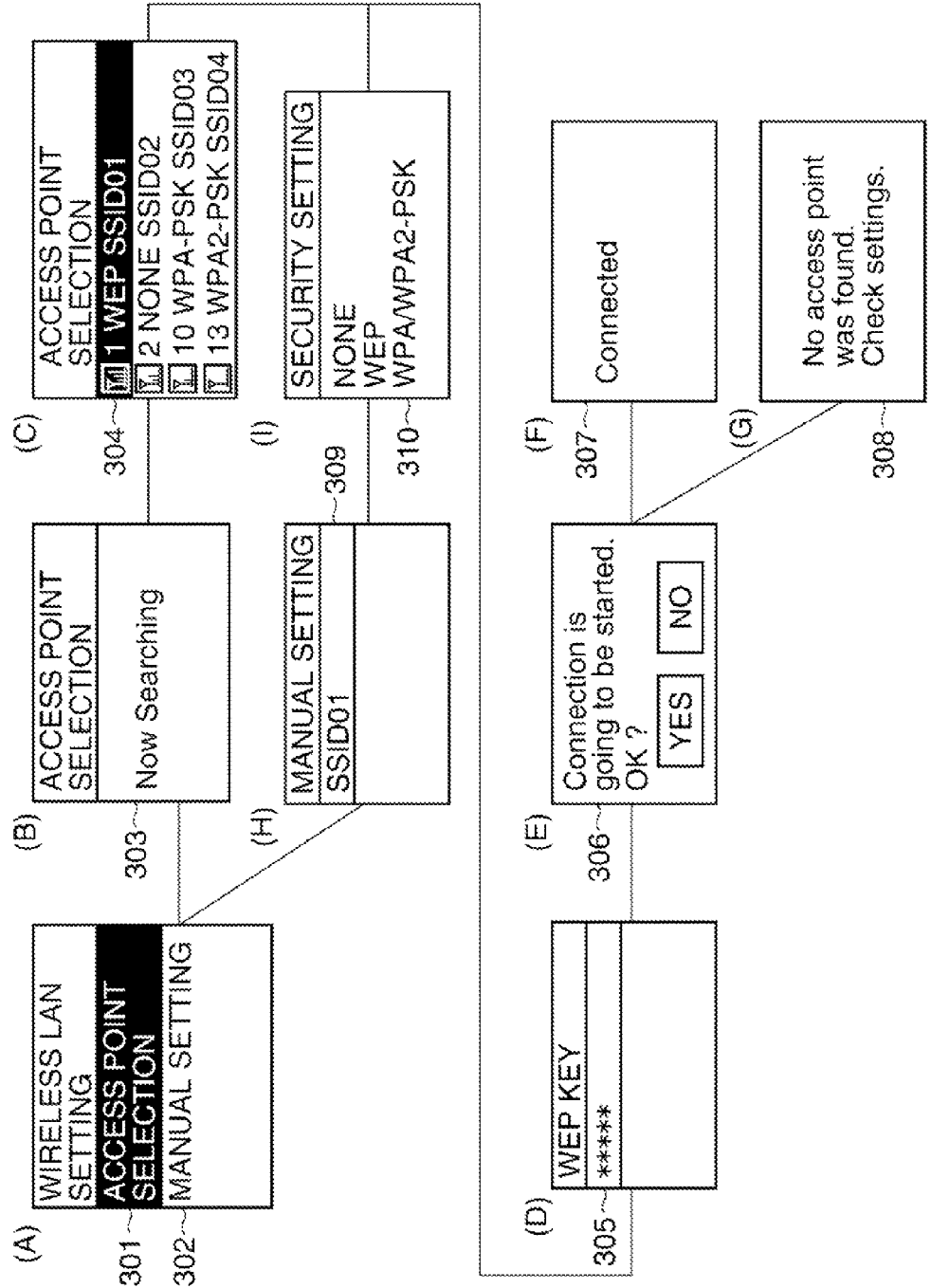
[FIG. 3] A view illustrating screens displayed on the console panel in which (A) shows a wireless LAN screen; (B) shows a message to the effect that search is being performed; (C) shows a search result list; (D) shows a key information input screen; (E) shows a message to the effect that connection is started; (F) shows an example of a message displayed when connection is successful; (G) shows an example of a message displayed when connection is unsuccessful; (H) shows an SSID manual setting screen; and (I) shows a security setting screen.

FIG. 3 is a view illustrating screens displayed on the console panel 110.

In the case of connecting the image forming apparatus 100 to the access point 120, first, the user selects the menu key 212 on the console panel 110. As a consequence, the CPU 102 causes the display section 204 to display a wireless LAN setting screen illustrated in (A) of FIG. 3. On the wireless LAN setting screen illustrated in (A) of FIG. 3, the user can select a method of setting the wireless LAN.

In the illustrated example, two selection methods, i.e. an access point selection 301 and a manual setting 302, are displayed on the wireless LAN setting screen. The access point selection 301 is a method in which a desired access point is selected from a result of search for access points around the image forming apparatus 100 to connect the image forming apparatus 100 to the selected access point. On the other hand, the manual setting 302 is a method in which information on settings of a specific access point is manually input by the user to connect the image forming apparatus 100 to the access point.

When the access point selection 301 is selected on the wireless LAN setting screen, the CPU 102 starts access point search and causes the display section 204 to display a message to the effect that the access point search is being performed ("now searching") 303, as illustrated in (B) of FIG. 3. When the access point search is completed, the CPU 102 causes the display section 204 to display a search result list illustrated in (C) of FIG. 3.

In the present example, it is assumed that four access points have been found. In the search result list, radio field intensity, a wireless channel (hereinafter simply referred to as a "channel"), security, and an SSID name are displayed in association with each of the access points.

Now, it is assumed that the user has selected an uppermost (first) search result (access point) 304 from the search result list. If the selected access point has been configured for security (has security settings), the CPU 102 causes the display section 204 to display a key information input screen illustrated in (D) of FIG. 3. Although in (D) of FIG. 3, "WEP (wired equivalent privacy) key" is displayed as an requested item of key information, if a WPA (Wi-Fi protected access) access point is selected in the access point selection screen (i.e. from the search result list) illustrated in (C) of FIG. 3, "WPA key" is displayed.

When key information 305 is input in the key information input screen, the CPU 102 causes the display section 204 to display a message to the effect that connection is to be started ("Connection is going to be started. OK?") 306, as shown in (E) of FIG. 3. If "YES" is selected in a screen illustrated in (E) of FIG. 3, the CPU 102 starts connection to the access point, whereas if "NO" is selected, the CPU 102 cancels connection to the access point.

After the connection processing is over, if the connection is successful, the CPU 102 causes the display section 204 to display a message ("Connected") 307, as shown in (F) of FIG. 3. On the other hand, when the connection is unsuccessful, the CPU 102 causes the display section 204 to display a message ("No access point was found. Check settings") 308, as shown in (G) of FIG. 3. Note that the message displayed when connection is unsuccessful is only an example, and an error message correspondinc to an error that has occurred during the connection processing is displayed.

When the manual setting 302 is selected on the wireless LAN setting screen illustrated in (A) of FIG. 3, the CPU 102 causes the display section 204 to display an SSID manual setting screen illustrated in (H) of FIG. 3. When the user sets a desired SSID (e.g. an SSID 309) on the screen, the CPU 102 causes the display section 204 to display a security setting screen illustrated in (I) of FIG. 3.

On the security setting screen, it is required to select the same security as set for the access point, and therefore it is required to select one from three options 310 "none", "WEP", and "WPA/WPA2-PSK", as shown in (I) of FIG. 3. If WEP is selected in the illustrated example, the processing described with reference to (D) to (G) of FIG. 3 is executed.

Now, a description will be given first, with reference to FIGS. 4 and 5, of a conventional access point search method, for ease of understanding of an access point search method in the present embodiment. Note that an image forming apparatus which is capable of executing the conventional access point search method is assumed to have the same hardware configuration as that of the image forming apparatus 100 shown in FIGS. 1 and 2.

Figure 4:
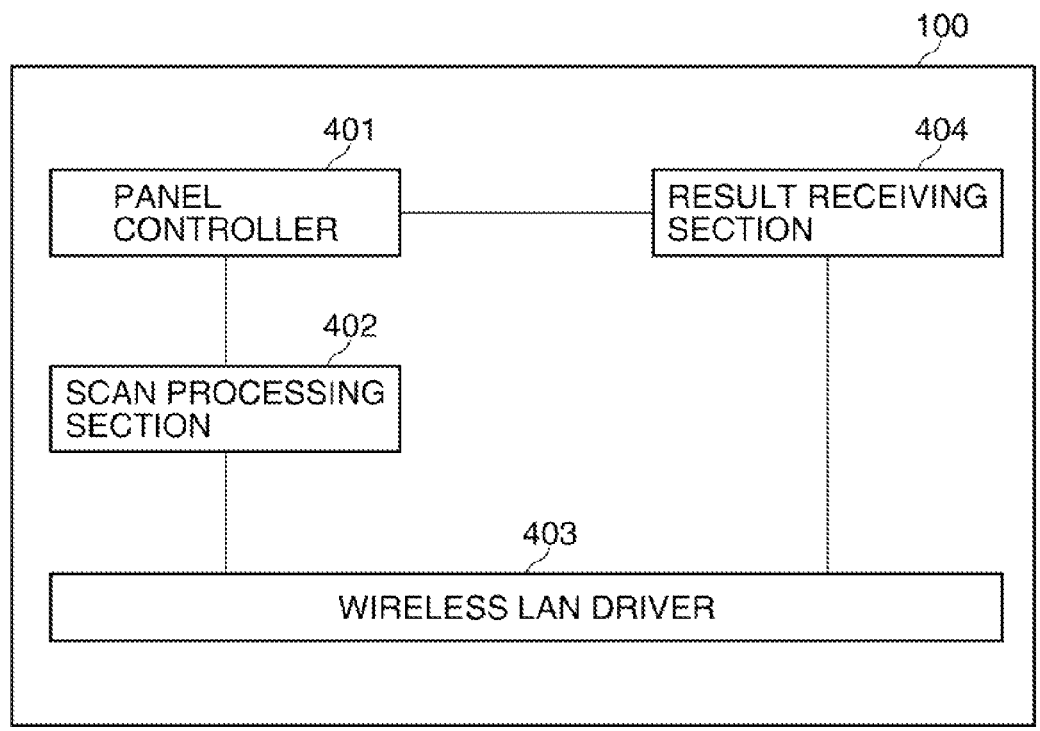
[FIG. 4] A block diagram useful in explaining the software configuration of a conventional access point search function.

FIG. 4 is a block diagram useful in explaining the software configuration of a conventional access point search function. The software function shown in FIG. 4 is realized by execution of a control program by the CPU 102 of the conventional image forming apparatus.

A panel controller 401 receives an instruction input by the user via the console panel 110. When an access point search instruction input by the user via the console panel 110 is received, the panel controller 401 requests a scan processing section 402 to start access point search. Further, the panel controller 401 causes the console panel 110 to display an access point search result.

When the request for starting access point search is received from the panel controller 401, the scan processing section 402 issues an access point search request to a wireless LAN driver 403.

The wireless LAN driver 403 issues a search request to the wireless LAN interface 117. At this time, the Wireless LAN driver 403 requests the wireless LAN interface 117 to search all channels from channel 1 to a maximum channel. Note that frequency bands allowed e.g. by the Radio Law differ from country to country, and a maximum frequency band allowed in each country is referred to as the maximum channel (channel 13 in Japan). In the present embodiment, the following description will be given assuming that channel 13 is the maximum channel.

A result receiving section 404 receives a result of the search by the wireless LAN interface 117 via the wireless LAN driver 403, and stores the search result in a search area provided in the RAM 103. Then, the result receiving section 404 notifies the panel controller 401 that storage of the search result has been completed.

Figure 5:
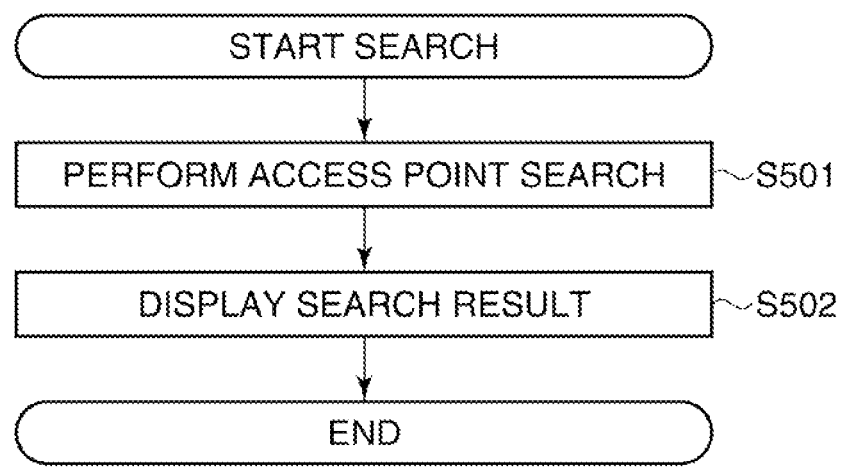
[FIG. 5] A flowchart of an access point search process executed by the access point search function in FIG. 4.

FIG. 5 is a flowchart of an access point search process executed by the conventional access point search function. This access point search process is executed by the CPU 102 of the conventional image forming apparatus by loading a program stored in the ROM 104 or another memory into the RAM 103 and executing the same.

When the user inputs an access point search instruction via the console panel 110, the wireless LAN driver 403 requests the wireless LAN interface 117 to search all the channels from channel 1 to the maximum channel. In a step S501, the wireless LAN interface 117 having received the request searches all the channels for access points.

After the wireless LAN interface 117 has searched all the channels, the result receiving section 404 stores the result of the search in the search area provided in the RAM 103. Then, in a step S502, the console panel 110 displays the search result. A screen displaying the search result on the console panel 110 at this time corresponds e.g. to the access point selection screen (search result list) illustrated in (C) of FIG. 3.

Next, a description will be given, with reference to FIGS. 6 to 8, of an access point search method in the present embodiment.

Figure 6:
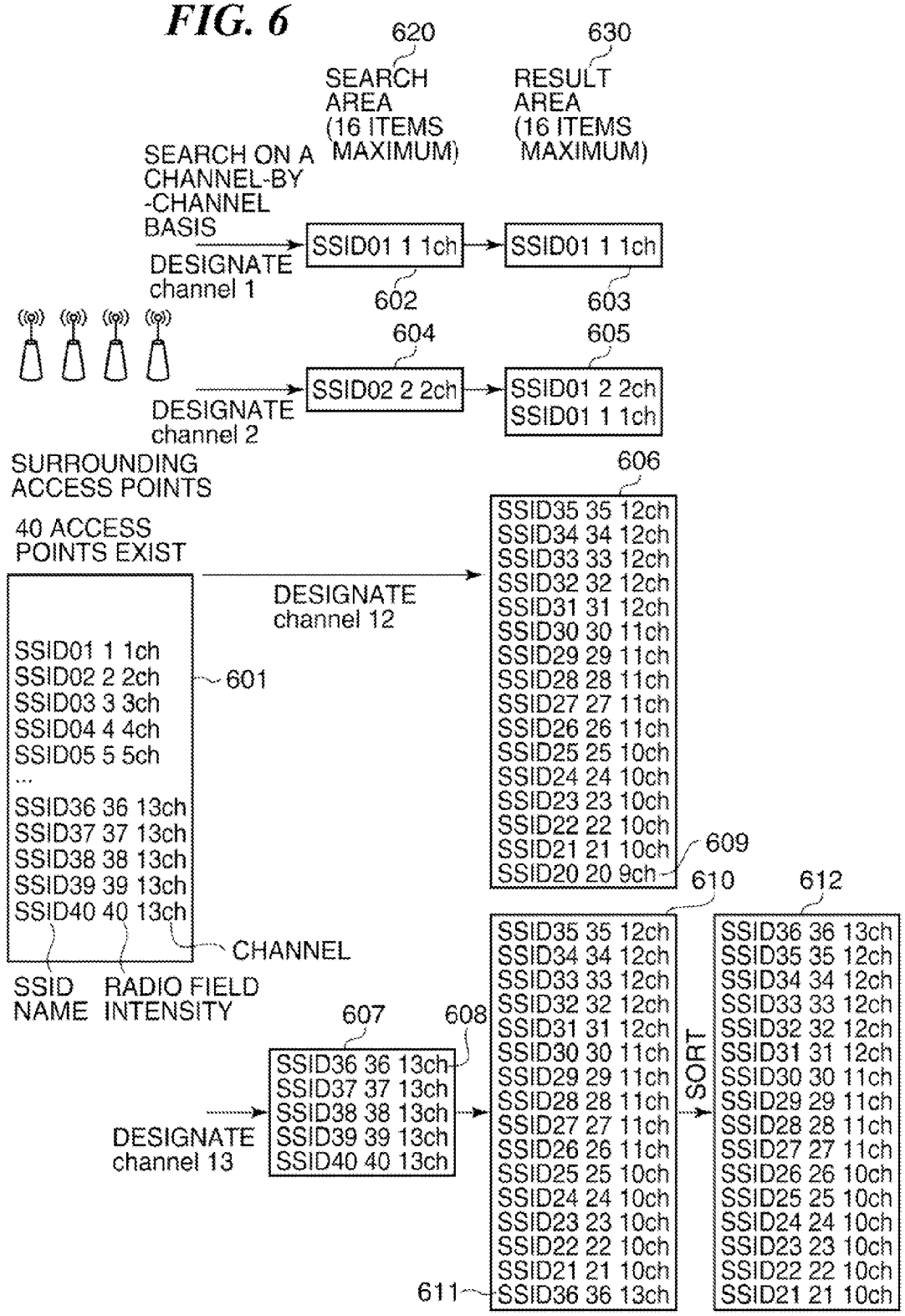
[FIG. 6] A diagram showing a process of search executed by an access point search function of the image forming apparatus as the wireless access point search device according to the first embodiment of the present invention.

FIG. 6 is a diagram showing a process of search executed by the access point search method in the present embodiment. FIG. 6 illustrates a case where forty access points exist around the image forming apparatus 100. In an access point list 601 showing the forty access points, there are sequentially enumerated SSID names, values of radio field intensity, and channels.

In the conventional access point search function, the wireless LAN driver 403 instructs the wireless LAN interface 117 to search all the channels, but when the memory capacity is small, the capacity of the search area provided in the RAM 103 is limited. Therefore, under an environment where a large number of access points are found, a case often occurs in which a search result fails to be stored as the search proceeds toward the final one of channels that can be used. To prevent this, in the access point search function of the present embodiment, first, channel 1 is designated for access point search, and the result of the search is acquired. Then, this process is applied to each of the following channels from channel 2 to channel 13 in the mentioned order, whereby search results are sequentially acquired on a channel-by-channel basis.

First, in the present embodiment, channel 1 is designated for access point search. In the example shown in FIG. 6, when channel 1 is designated and searched, one item of access point-associated data (hereinafter referred to as "access point data") is obtained as a search result 602 and stored in a search area 620 provided in the RAM 103. Then, the search result 602 is stored as access point search data 603 in a result area 630 provided in the RAM 103.

Similarly, a search result obtained when channel 2 is designated is stored as a search result 604 in the search area 620. At this time, the search result 604 is written over the search result 602 and stored in the search area 620. Then, the search result 604 is added to the result area 630, i.e. additionally stored in the result area 630, as access point search data 605. At this time, access point data items stored in the result area 630 are sorted according to a specific condition. Although in the present embodiment, the access point data items are sorted in descending order of radio field intensity, the specific condition is not limited to this.

Access point search data 606 shows a result obtained by completing the access point search of channel 1 to channel 12. At this time, sixteen access point data items as the maximum number of items that can be stored in the result area 630 are stored in the result area 630.

It is assumed that in this state, access point search is performed by designating channel 13, and five access point data items are stored as a search result 607 in the search area 620. The search result 607 cannot be added to the result area 630 in this state, and therefore, in the present embodiment, an access point data item 609 at the bottom of the access point search data 606 and an access point data item 608 at the top of the search result 607 are compared in respect of radio field intensity. In the example shown in FIG. 6, since the radio field intensity of the access point data item 608 is higher than that of the access point data item 609, the access point data item 609 is replaced with the access point data item 608, and the access point data item 608 is stored in the result area 630. Thus, an access point search data 610 is obtained. It is known from the access point search data 610 that the access point data item 608 is stored as an access point data item 611 in the result area 630. Then, access point data items of the access point search data 610 are sorted in the descending order of radio field intensity, whereby an access point search data 612 is obtained. The search result 607 contains four access point data items other than the access point data item 608, and hence the same processing is performed on each of these access point data items.

Figure 7:
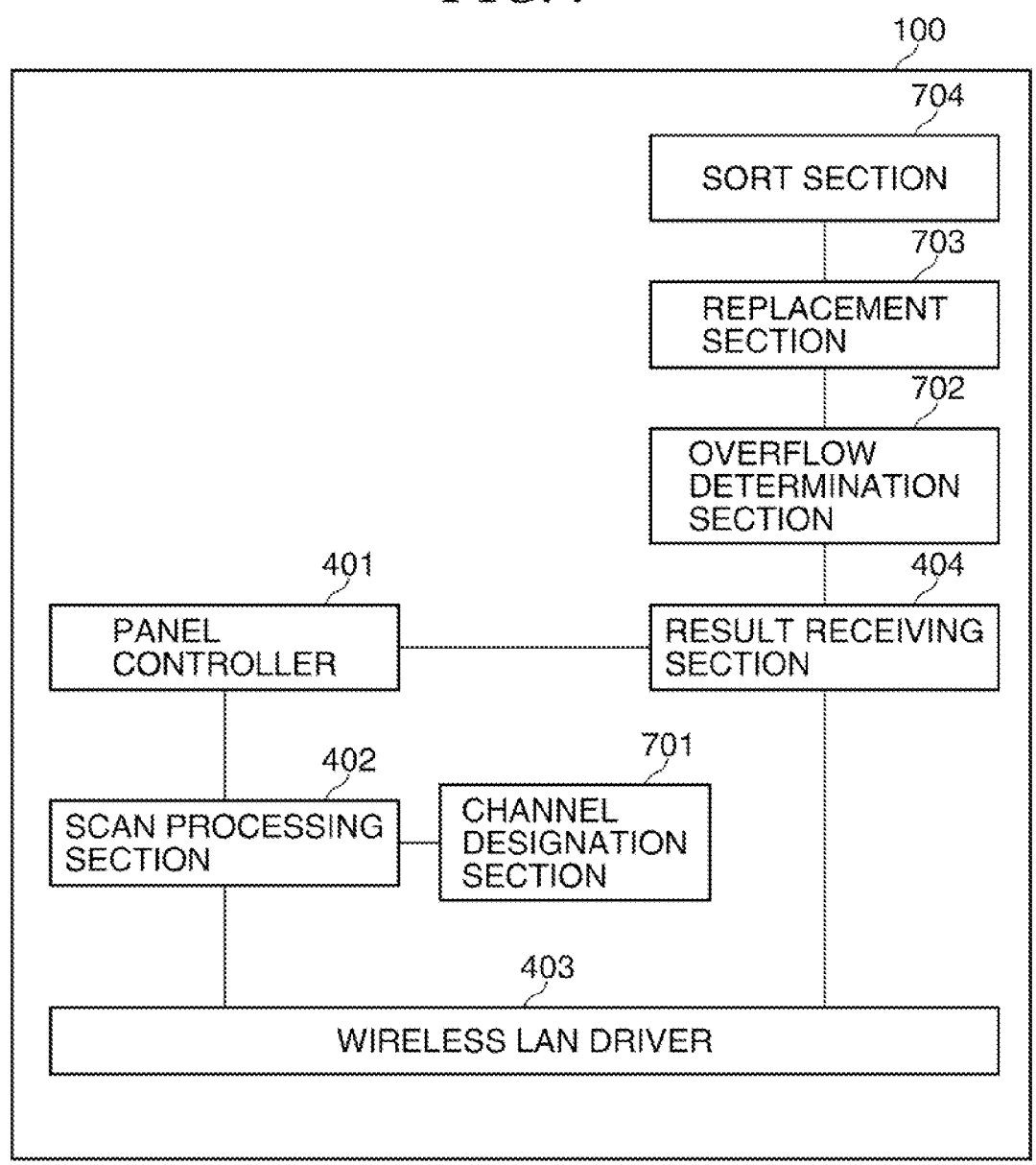
[FIG. 7] A block diagram useful in explaining the software configuration of the access point search function of the image forming apparatus as the wireless access point search device according to the first embodiment of the present invention.

FIG. 7 is a block diagram useful in explaining the software configuration of the access point search function of the image forming apparatus as the wireless access point search device according to the present embodiment. Software functions appearing in FIG. 7 are realized by execution of a control program by the CPU 102 of the image forming apparatus 100. Software functions denoted by the same reference numerals as those in FIG. 4 are the same functions described with reference to FIG. 4, and therefore description thereof is omitted.

A channel designation section 701 designates a channel to be subjected to access point search by the wireless LAN driver 403. In the present embodiment, it is assumed that channel 1 to channel 13 are sequentially designated in ascending order of channel number, but this is not limitative. The order of search may be set by the user in advance.

An overflow determination section 702 determines whether or not the sum of the number of access point data items stored as access point search results in the search area 620 and the number of access point data items stored as preceding search results in the result area 630 is larger than the maximum number of access point data items that can be stored in the result area 630. Note that the number of access point data items stored as access point search results in the search area 620 will be hereinafter referred to as "the found access point count", the number of access point data items stored as preceding search results in the result area 630 as "the stored access point count", and the maximum number of access point data items that can be stored in the result area 630 as "the result area count".

When the overflow determination section 702 determines that the sum of the found access point count and the stored access point count is larger than the result area count, a replacement section 703 performs determination as to which of an access point data item stored at the bottom of the result area 630 and an access point data item stored in the search area 620 has a higher radio field intensity. If it is determined that the access point data item stored in the search area 620 has a higher radio field intensity than the access point data item stored at the bottom of the result area 630, the replacement section 703 replaces the access point data item stored at the bottom of the result area 630 with the access point data item stored in the search area 620. On the other hand, if it is determined that the access point data item stored at the bottom of the result area 630 has a higher radio field intensity than the access point data item stored in the search area 620, the replacement section 703 does not perform replacement between the access point data item stored at the bottom of the result area 630 and the access point data item stored in the search area 620. Note that when a plurality of access points are found as in the case of the search result 607, the associated access point data items are all subjected to the processing by the replacement section 703.

When replacement of access point data items is performed by the replacement section 703 or when an access point data item is newly stored in the result area 630, a sort section 704 sorts access point data items in descending order of radio field intensity.

FIG. 8 is a flowchart of an access point search process executed by the image forming apparatus as the wireless access point search device according to the present embodiment. This access point search process is executed by the CPU 102 of the image forming apparatus 100 by loading a program stored in the ROM 104 or another memory into the RAM 103 and executing the same.

In a step S801, the channel designation section 701 designates a channel to be searched. In the present embodiment, the channels are designated sequentially in ascending order of channel number from channel 1 to channel 13.

In a step S802, the wireless LAN interface 117 searches the designated channel (channel 1 when the loop is executed for the first time) for an access point.

When the search in the step S802 is completed, the overflow determination section 702 determines in a step S803 whether or not the sum of the found access point count and the stored access point count is larger than the result area count. In other words, the overflow determination section 702 determines whether or not the sum of the number of access point data items stored in the memory and that of access points found in the present search is larger than the capacity of the memory. If the overflow determination section 702 determines that the sum of the found access point count and the stored access point count is larger than the result area count, the process proceeds to a step S804.

In the step S804, the replacement section 703 determines whether or not the radio field intensity of an access point data item stored in the search area 620 is higher than that of an access point data item stored at the bottom of the result area 630. In other words, in this step, it is determined which of an access point data item obtained by the present search and an access point data item already stored satisfies a predetermined specific condition (i.e. which has a higher radio field intensity). If a plurality of access point data items are stored in the search area 620 as in the case of the search result 607, the access point data items are sequentially subjected to this processing. The processing order is not particularly limited, but in the present embodiment, it is assumed that the access point data items are sequentially subjected to the processing in order of being stored in the search area 620.

If the replacement section 703 determines in the step S804 that the radio field intensity of the access point data item stored in the search area 620 is higher than that of the access point data item stored at the bottom of the result area 630, the process proceeds to a step S805. In the step S805, the replacement section 703 replaces the access point data item stored at the bottom of the result area 630 with the access point data item stored in the search area 620. Then, in a step S806, the sort section 704 sorts the access point data items stored in the result area 630 in descending order of radio field intensity.

On the other hand, if the replacement section 703 determines in the step S804 that the radio field intensity of the access point data item stored in the search area 620 is lower than that of the access point data item stored at the bottom of the result area 630, the process proceeds to a step S807. In this case, since the access point data item stored in the search area 620 is lower in radio field intensity than any of the access point data items stored in the result area 630, the former is not stored in the result area 630. Thus, access point data items having high radio field intensity are sequentially stored in the result area 630.

In the step S807 following the step S804 or S806, the replacement section 703 determines whether or not there remains an access point data item that has not yet undergone the determination processing in FIG. 804. If there remains an access point data item that has not yet undergone the determination processing in FIG. 804 (YES to the step S807), the process returns to the step S804, wherein a next access point data item is subjected to the determination processing. On the other hand, if all access point data items stored in the search area 620 have already undergone the determination processing in FIG. 804 (NO to the step S807), the process proceeds to a step S808.

On the other hand, if the overflow determination section 702 determines in the step S803 that the sum of the found access point count and the stored access point count is smaller than the result area count, the process proceeds to a step S810.

In the step S810, the result receiving section 404 stores the access point data item stored in the search area 620 in the result area 630. Then, in a step S811, the sort section 704 sorts the access point data items stored in the result area 630 in descending order of radio field intensity, and then the process proceeds to the step S808.

In the step S808, the channel designation section 701 determines whether or not it is necessary to designate a next channel. When all of the thirteen channels have not been searched, the channel designation section 701 determines that it is necessary to designate the next channel, and the process returns to the step S801. Then, in the step S801, the channel designation section 701 designates the next channel, and the steps S802 et seq. are executed.

On the other hand, when all of the thirteen channels have been searched, the channel designation section 701 determines in the step S808 that it is not required to designate a next channel, and the process proceeds to a step S809. In the step S809, the panel controller 401 causes the console panel 110 to display such a search result list screen as illustrated in (C) of FIG. 3, as an access point search result.

As described above, according to the first embodiment, in performing access point search, the access point search is performed on a channel-by-channel basis instead of searching all the channels at a time, and then access point data items are sequentially stored in the result area. In this case, the access point data items are sequentially stored in descending order of radio field intensity depending on the capacity of the result area. Therefore, it is possible to reduce the possibility of failing to store access point data items having high radio field intensity in the result area.

In general, it can be envisaged that an access point desired to be connected by a user exists near the user and has a high radio field intensity. In such a case, access point data items high in radio field intensity are displayed on the console panel 110, and hence even when the memory capacity is small, it rarely occurs that data on the access point desired to be connected by the user cannot be stored.

Next, a second embodiment of the present invention will be described. The present embodiment has the same hardware configuration as that of the first embodiment, and is distinguished from the first embodiment only in that an access point search method is employed which is a combination of the conventional access point search method and the access point search method described in the first embodiment. Therefore, components corresponding to those in the first embodiment are denoted by the same reference numerals, and description thereof is omitted.

Specifically, first, the conventional access point search method is executed, whereby access point search is performed on all the channels. Then, when the search gives a larger amount of access point data (data amount) to be stored than the capacity of the result area in the RAM 103, the conventional access point search method is switched to the access point search method of the first embodiment, whereby access point search is performed sequentially of all the channels on a channel-by-channel basis. More specifically, a comparison is made between the data amount defined by the number of access point data items of wireless access points found through the access point search performed of all the channels and the memory capacity, whereby it is determined, according to the result of the comparison, whether or not to execute the access point search method of the first embodiment.

As described above, according to the second embodiment, only when the amount of access point data which is substantially proportional to the number of access point data items obtained through access point search performed of all the channels is larger than the memory capacity, the access point search is performed again on a channel-by-channel basis, which makes it possible to perform search process efficiently.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, it is possible to utilize the functions of the above-described embodiments as a control method and cause an apparatus, such as an image forming apparatus, to execute the control method. Further, a control program realizing the functions of the above-described embodiments may be executed by a computer provided in an apparatus, such as an image forming apparatus.

In this case, the control method includes and the control program includes at least searching, storing, and controlling, as defined in an appended claim. Note, that the control program is recorded e.g. in a computer-readable storage medium.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

REFERENCE SIGNS LIST 401 panel controller
402 scan processing section
403 wireless LAN driver
404 result receiving section
620 search area
630 result area
701 channel designation section
702 overflow determination section
703 replacement section
704 sort section

The invention claimed is:

1. An access point search device comprising:
a processor connected to a memory, the processor and memory being configured to:
search for an access point
store an information item related to an access point found by the search, into a first storage area;
store the information item related to the access point stored in the first storage area, into a second storage area;
display a result of the search for the access point, based on an information item stored in the second storage area; and
determine whether or not a sum of the number of newly-found access points identified by the information items stored in the first storage area and the number of already-found access points identified by the information items stored in the second storage area, is greater than a predetermined number,
wherein in a case where it is determined that the sum is greater than the predetermined number, the information items stored in the first storage area are stored into the second storage area, and an information item related to an access point which is less in radio field intensity than the newly-found access point is deleted from among the information items stored in the second storage area.

2. The access point search device according to claim 1, wherein said processor and memory are further configured to search access points regarding all wireless channels on a channel-by-channel basis.

3. The access point search device according to claim 1, wherein in a case where it is determined that the sum is the predetermined number or less, the information item stored in the first storage area is stored into the second storage area, without any information item stored in the second storage area being deleted.

4. The access point search device according to claim 1,
wherein the information items related to the access points, which are stored in the second storage area, are sorted in descending order of radio field intensity of the access point identified thereby,
wherein in a case where it is determined that the sum is greater than the predetermined number, a radio field intensity of the newly-found access point is compared to a radio field intensity of an access point identified by an information item stored at a bottom of the second storage area, and
wherein in a case where, as a result of the comparison, the newly-found access point is greater in radio field intensity than the access point identified by the information item stored at the bottom of the second storage area, the information item stored in the first storage area is stored into the second storage area while the information item stored at the bottom of the second storage area is deleted.

5. The access point search device according to claim 4, wherein, when, as a result of the comparison, the newly-found access point is less in radio field intensity than an access point identified by the information item stored at the bottom of the second storage area, the information item stored in the first storage area is not into the second storage area.

6. The access point search device according to claim 1, the processor and memory being further configured to perform printing.

7. The access point search device according to claim 1, the processor and memory being further configured to:

search a particular channel out of a plurality of channels, for an access point, wherein in a case where the process, wherein the information item related to the access point stored in the first storage area, has been stored into a second storage area, based on the result of the search of the particular channel for the access point, has been completed, a next channel of the particular channel is searched for an access point.

8. The access point search device according to claim 1, wherein the predetermined number indicates an upper limit of an allowable number for storing the information items related to the access points into the second storage area.

9. The access point search device according to claim 1, wherein the information item related to the access point, includes SSID.

10. A computer implemented method of searching for a wireless an access point, the computer including a hardware processor and a memory, the method comprising the steps of:

searching for an access point;

storing an information item related to an access point found by the searching, into a first storage area;

storing the information item related to the access point stored in the first storage area, into a second storage area;

displaying a result of the search for the access point, based on an information item stored in the second storage area; and determining whether or not a sum of the number of newly-found access points identified by the information items stored in the first storage area and the number of already-found access points identified by the information items stored in the second storage area, is greater than a predetermined number, wherein in a case where it is determined that the sum is greater than the predetermined number, the information items stored in the first storage area are stored into the second storage area, and an information item related to an access point which is less in radio field intensity than the newly-found access point is deleted from among the information items stored in the second storage area, and wherein the various steps of the method are performed by the hardware processor and the memory.

11. A non-transitory computer-readable storage medium storing a computer-executable program for causing a computer to execute a method of searching for an access point, wherein the method comprises:

searching for an access point;

storing an information item related to an access point found by the searching, into a first storage area;

storing the information item related to the access point stored in the first storage area, into a second storage area;

displaying a result of the search for the access point, based on an information item stored in the second storage area; and determining whether or not a sum of the number of newly-found access points identified by the information items stored in the first storage area and the number of already-found access points identified by the information items stored in the second storage area, is greater than a predetermined number, wherein in a case where it is determined that the sum is greater than the predetermined number, the information items stored in the first storage area are stored into the second storage area, and an information item related to an access point which is less in radio field intensity than the newly-found access point is deleted from among the information items stored in the second storage area.

* * * * *